United States Patent
Yu

(10) Patent No.: US 11,701,574 B2
(45) Date of Patent: Jul. 18, 2023

(54) BASE FOR ROLLER SKATES

(71) Applicant: AMULA ENTERPRISE CORP., Mahe (SC)

(72) Inventor: Juei-Chieh Yu, Taipei (TW)

(73) Assignee: AMULA ENTERPRISE CORP., Mahe (SC)

( * ) Notice: Subject to any disclaimer, the term of this patent is extended or adjusted under 35 U.S.C. 154(b) by 22 days.

(21) Appl. No.: 17/370,374

(22) Filed: Jul. 8, 2021

(65) Prior Publication Data

US 2023/0009518 A1 Jan. 12, 2023

(51) Int. Cl.
| | |
|---|---|
| A63C 17/14 | (2006.01) |
| B29L 31/52 | (2006.01) |
| B29C 45/14 | (2006.01) |
| B29K 705/02 | (2006.01) |

(52) U.S. Cl.
CPC ...... *A63C 17/1436* (2013.01); *A63C 2203/42* (2013.01); *B29C 45/14311* (2013.01); *B29C 2045/14868* (2013.01); *B29K 2705/02* (2013.01); *B29L 2031/52* (2013.01)

(58) Field of Classification Search
CPC ............ A63C 17/1436; A63C 2203/42; B29C 45/14311; B29C 2045/14868; B29K 2705/02; B29L 2031/52
See application file for complete search history.

(56) References Cited

U.S. PATENT DOCUMENTS

| | | | | | |
|---|---|---|---|---|---|
| 4,058,323 | A | * | 11/1977 | Ware, Jr. ................. | A63C 17/02 280/841 |
| 5,645,287 | A | * | 7/1997 | Soo ........................ | A63C 17/06 280/11.216 |
| 5,876,044 | A | * | 3/1999 | Yin ....................... | A43B 5/1641 280/11.3 |
| 6,189,898 | B1 | * | 2/2001 | Benoit ..................... | A63C 1/42 280/11.221 |
| 2004/0222602 | A1 | * | 11/2004 | van Egeraat ......... | A63C 17/067 280/11.27 |
| 2009/0256322 | A1 | * | 10/2009 | Wan ..................... | A63C 17/068 280/11.223 |

(Continued)

FOREIGN PATENT DOCUMENTS

KR 1930251 B1 * 12/2018 ......... A63C 17/0046

*Primary Examiner* — James A Shriver, II
*Assistant Examiner* — Michael T. Walsh
(74) *Attorney, Agent, or Firm* — Muncy, Geissler, Olds & Lowe, P.C.

(57) ABSTRACT

A base for roller skates includes a skeleton and a reinforcing shell. The skeleton is made of a first material through one-time processing and is formed with a plurality of hollow areas. The reinforcing shell includes a plurality of inlaid structures respectively embedded in the hollow areas is directly disposed on the skeleton by injection molding with a second material. The second material is different from the first material. Two roller frame mounting hole sets on the base for roller skates are directly formed by the skeleton, and a brake block mounting hole and a treading platform on the base for roller skates are formed by the reinforcing shell. The base for roller skates is not made of single metal material like prior arts, making it capable of reducing fracture due to the hard and brittle characteristics of the material used in prior art.

12 Claims, 5 Drawing Sheets

(56) References Cited

U.S. PATENT DOCUMENTS

| | | | |
|---|---|---|---|
| 2012/0187642 A1* | 7/2012 | Corbeil | A63C 1/303 |
| | | | 280/11.18 |
| 2013/0075941 A1* | 3/2013 | Chang | B29C 45/14311 |
| | | | 219/121.41 |
| 2015/0048578 A1* | 2/2015 | Knoll | A63C 17/02 |
| | | | 280/11.27 |
| 2017/0072289 A1* | 3/2017 | Yeh | A63C 17/02 |
| 2019/0240562 A1* | 8/2019 | Wu | A63C 17/0093 |

* cited by examiner

US 11,701,574 B2

BASE FOR ROLLER SKATES

FIELD OF THE INVENTION

The invention relates to a base for roller skates, and more particularly to a base for roller skates made by injection molding with different materials.

BACKGROUND OF THE INVENTION

The existing skates are available in various styles; the common ones include inline skates, roller skates and ice skates. Users can choose according to their personal needs and preferences. Among them, rollers of the roller skates are disposed side by side. The roller skates provide higher stability and reduce the possibilities for users to fall while treading on the roller skates, and therefore they are widely favored by beginners.

The bases for roller skates currently available on the market are mostly made of metal materials, such as aluminum. Although the base made of this material for roller skates has high strength, it is limited by the hard and brittle characteristics of the metal material, resulting in the conventional base for roller skates being prone to embrittlement after subjected to strong impact. In addition, since metal materials have the problem of material fatigue after long-term usage, the conventional base for roller skates is prone to formation of gaps when replacing screws or bearings. Once the gap reaches a critical dimension, the base for roller skates will break.

SUMMARY OF THE INVENTION

A main object of the invention is to solve the problem of brittle fracture easily caused by the conventional base of roller skates being made of a single material.

In order to achieve the above object, the invention provides a base for roller skates comprising a skeleton and a reinforcing shell. The skeleton is made of a first material through one-time processing, which is formed with a plurality of hollow areas. The reinforcing shell is directly disposed on the skeleton by injection molding with a second material. The second material is different from the first material, and the reinforcing shell includes a plurality of inlaid structures respectively embedded in the hollow areas. Wherein, two roller frame mounting hole sets on the base for roller skates are directly formed by the skeleton, and a brake block mounting hole and a treading platform on the base for roller skates are formed by the reinforcing shell.

In one embodiment, the first material is metal, and a surface of the skeleton includes a sandblasting processed layer.

In one embodiment, the treading platform is divided into a first section provided on one side of the brake block mounting hole, a second section having an area smaller than that of the first section, and a connecting section connecting the first section and the second section and having an area smaller than that of the second section.

In one embodiment, the skeleton comprises two long plates disposed in parallel, and a plurality of connecting blocks disposed between the two long plates to form the two roller frame mounting hole sets, and the connecting blocks are disposed at intervals between the two long plates to form the hollow areas.

In one embodiment, each of the two long plates includes a plurality of notches respectively disposed corresponding to the hollow areas.

In one embodiment, each of the two long plates includes a body and a skirt whose extending direction is perpendicular to the body connected to one side edge of the body. The connection between the body and the skirt is formed with the hollow areas at intervals.

In one embodiment, one of the connecting blocks at an end of the skeleton is formed with a tube and a boss extending obliquely from a bottom edge of the tube in a direction relative to/facing the skeleton.

In one embodiment, one of the connecting blocks formed with the boss is formed with at least one of the hollow areas between the tube and the boss.

In one embodiment, each of the two long plates includes a body and a side wing which is disposed on one side of the boss connected to the body.

In one embodiment, a side surface of the boss relative to/facing the tube is formed with two end portions and a connecting recess connecting the two end portions, and the two end portions are located on two sides of the brake block mounting hole respectively.

Through the foregoing implementation of the invention, the invention includes the following features in comparison with the prior art: given the skeleton and the reinforcing shell of the base for roller skates of the invention being made of different materials, the reinforcing shell is capable of providing cushion and protection for the skeleton after being formed on the skeleton, so as to reduce the problem of brittle fracture easily caused by impact in the conventional base of roller skates.

DETAILED DESCRIPTION OF THE PREFERRED EMBODIMENTS

The detailed description and technical contents of the invention are described below with reference to the drawings.

Figure 1:
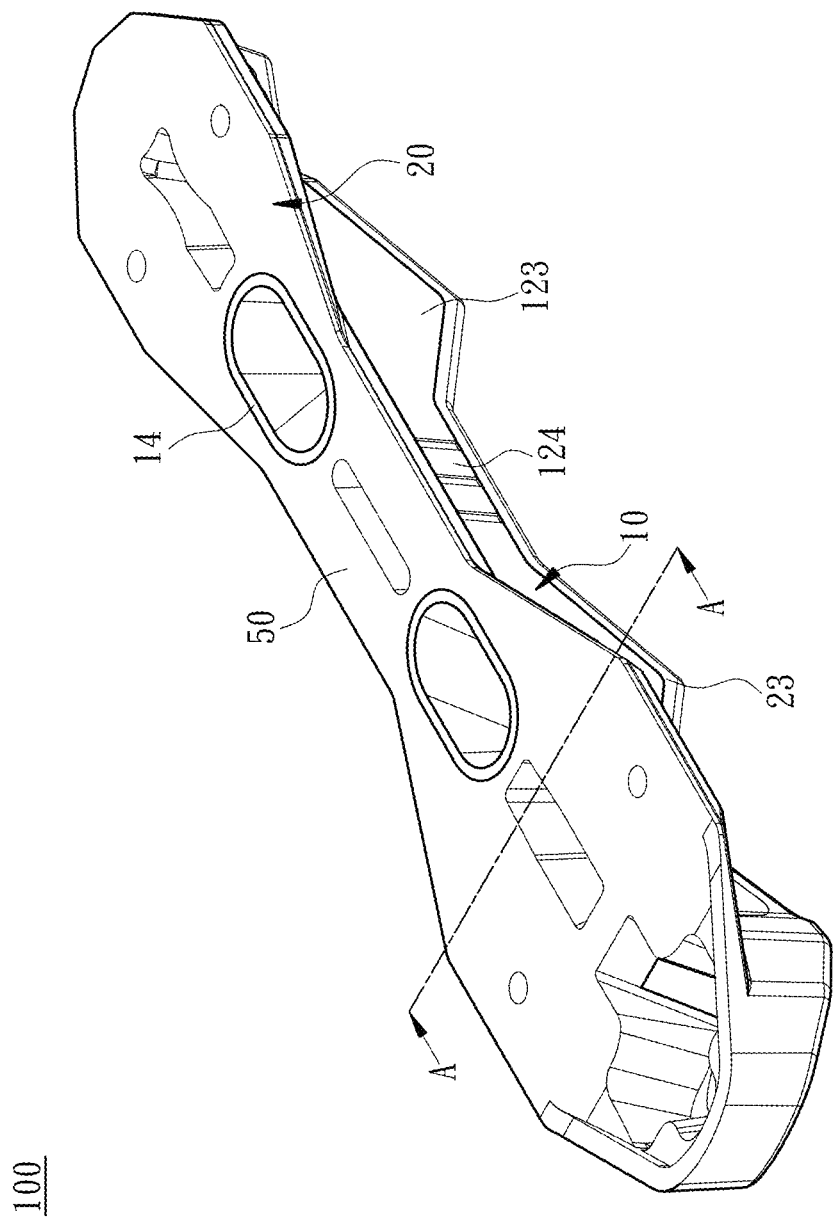
FIG. 1 is a three-dimensional structural representation of a base for roller skates according to an embodiment of the invention.
Figure 2:
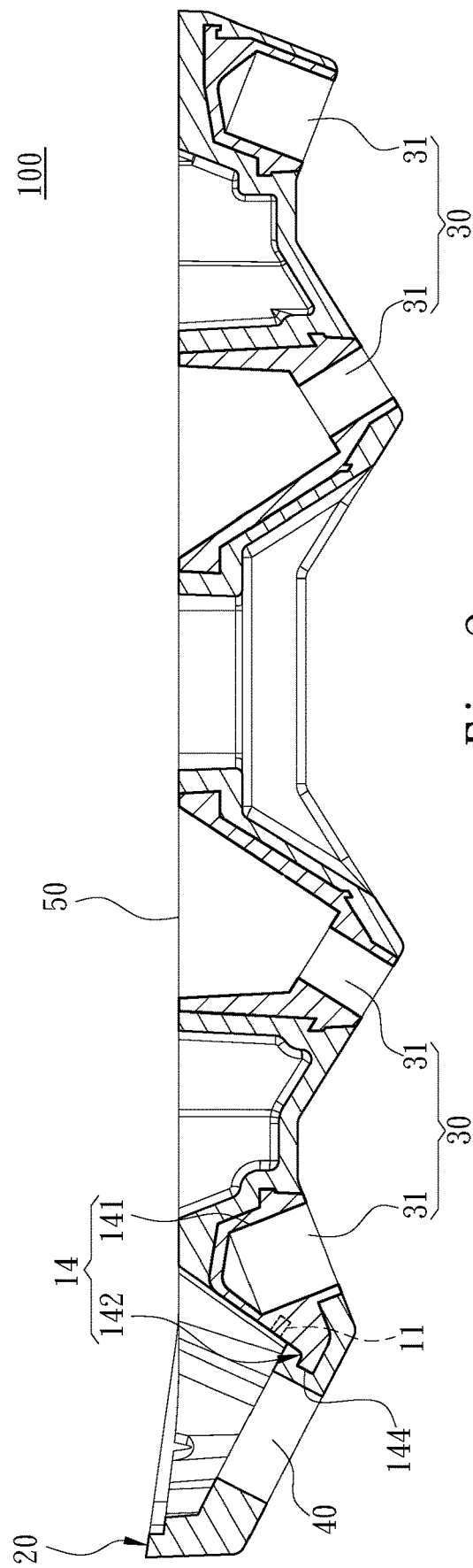
FIG. 2 is a cross-sectional view of a reinforcing shell according to an embodiment of the invention.
Figure 3:
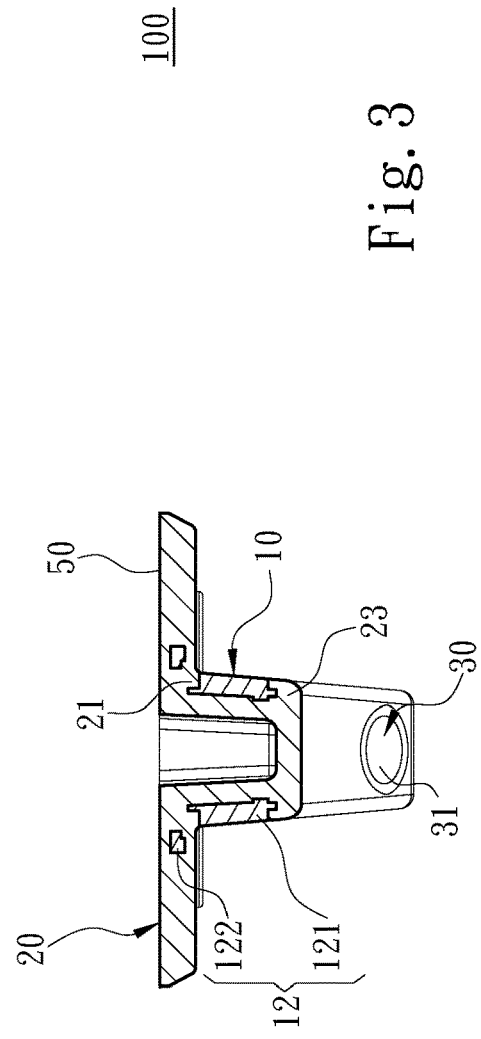
FIG. 3 is a cross-sectional view taken along line A-A in FIG. 1 of the base for roller skates according to an embodiment of the invention.
Figure 4:
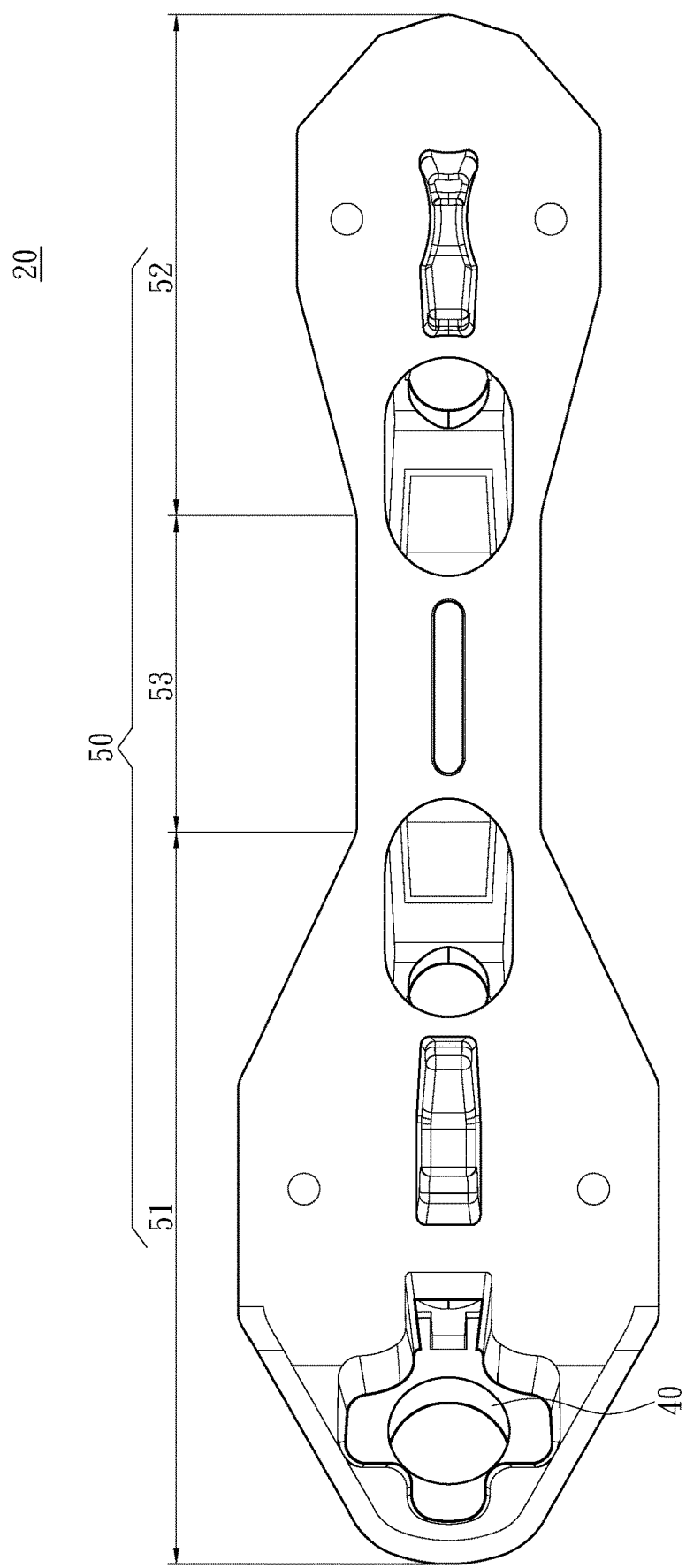
FIG. 4 is a top view from another direction of the base for roller skates according to an embodiment of the invention.
Figure 5:
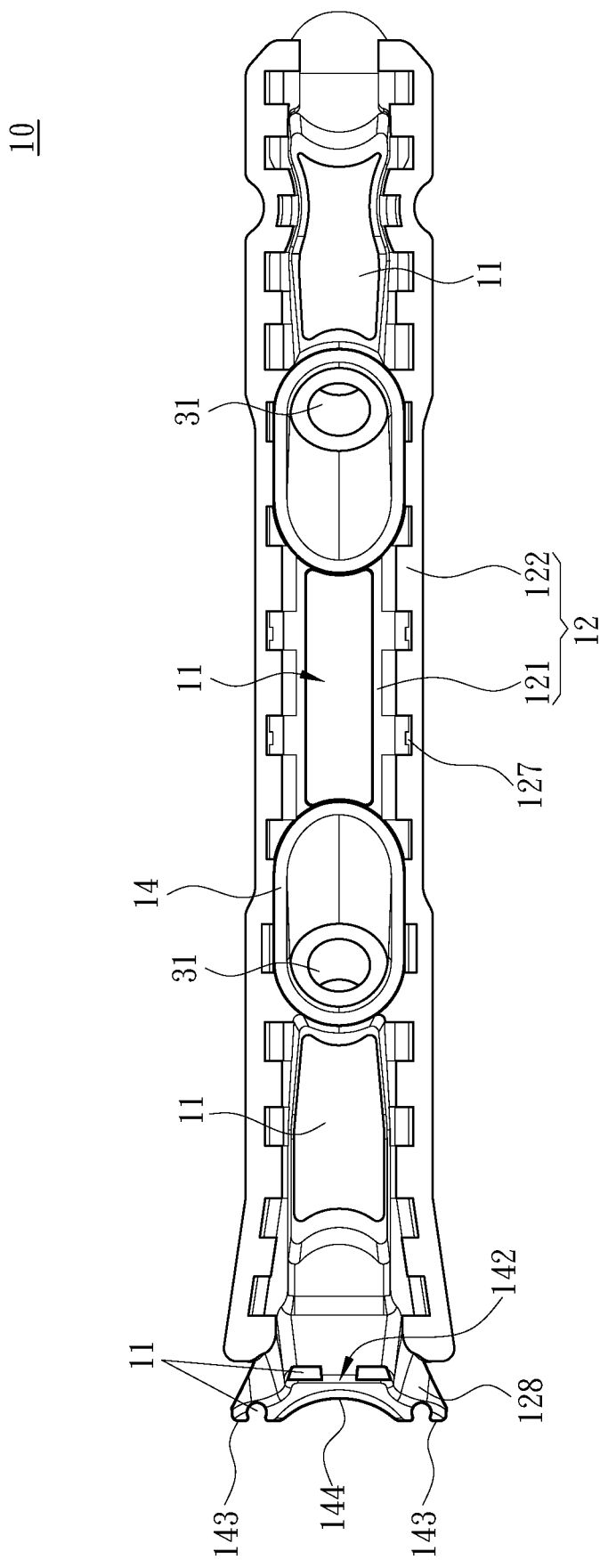
FIG. 5 is a top view of a skeleton according to an embodiment of the invention.
Figure 6:
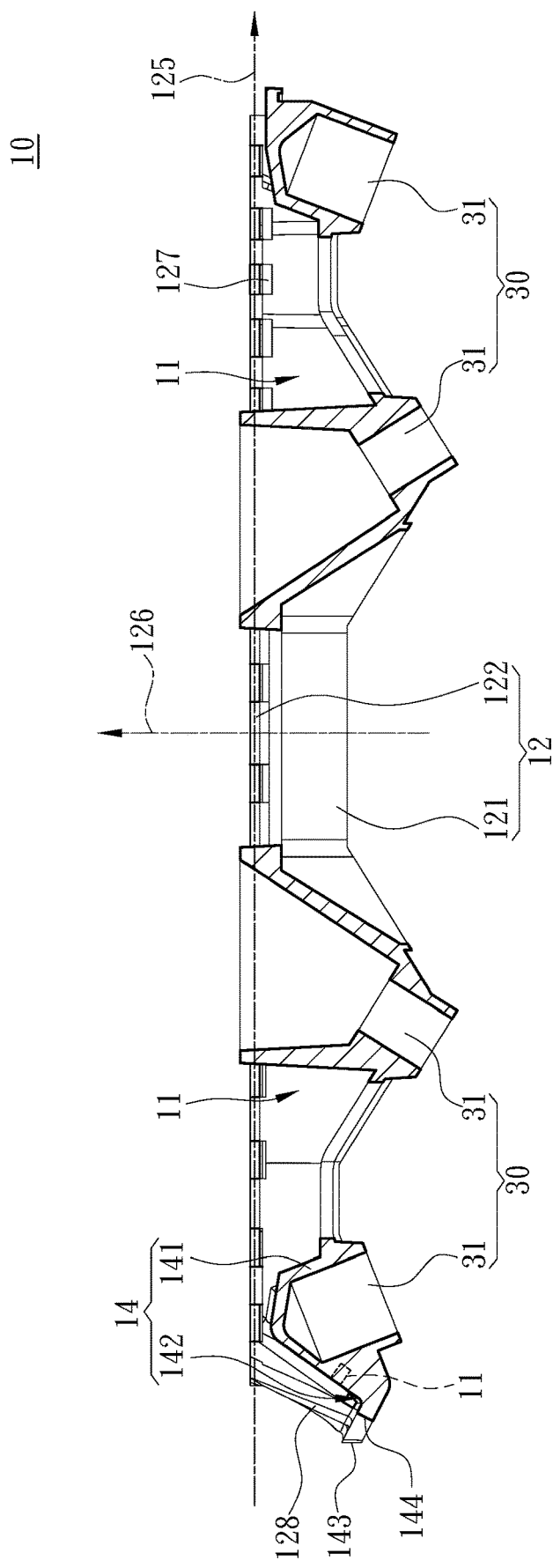
FIG. 6 is a cross-sectional view of the skeleton according to an embodiment of the invention.

Please refer to FIG. 1, FIG. 2, FIG. 3, FIG. 4, FIG. 5, and FIG. 6. The invention provides a base 100 for roller skates. The base 100 for roller skates comprises a skeleton 10 and a reinforcing shell 20. The skeleton 10 is made of a first material through one-time processing, the skeleton 10 is formed with a plurality of hollow areas 11, the reinforcing shell 20 is directly disposed on the skeleton 10 by injection molding with a second material, and the reinforcing shell 20 includes a plurality of inlaid structures 21 respectively embedded in the plurality of hollow areas 11. More specifically, the second material is different from the first material. For example, the first material could be a metal, such as aluminum. The skeleton 10 is formed by die casting of aluminum alloy. The second material could be a plastic material. Through the material toughness and elasticity of the plastic material, the reinforcing shell 20 has good impact resistance to be capable of providing cushion for the skeleton 10 and reducing fracture of the skeleton 10. In addition, the skeleton 10 could be sandblasted on a surface thereof before injection molding of the reinforcing shell 20, so that the surface of the skeleton 10 includes a sandblasting processed layer (not shown in the figures), which reduces damage of the surface of the skeleton 10 caused by molds, and thereby enhancing the aesthetics of the base 100 for roller skates. In another embodiment, the first material and the second material could also be adjusted according to actual needs. For example, the first material could be a plastic material, and the second material could be a metal material. From the foregoing description that the base 100 for roller skates of the present invention is mainly made up of the skeleton 10 and the reinforcing shell 20 of different materials, and the first material and the second material are not limited.

Further, the base 100 for roller skates includes two roller frame mounting hole sets 30, a brake block mounting hole 40, and a treading platform 50. The two roller frame mounting hole sets 30 of the are directly formed by the skeleton 10, and each of the two roller frame mounting hole sets 30 includes two oppositely disposed holes 31. The two holes 31 are respectively provided for installing a wheels set (not shown in the figures) and a bearing (not shown in the figures) connected to the wheels set. In addition, the brake block mounting hole 40 and the treading platform 50 are formed by the reinforcing shell 20, one side of the two roller frame mounting hole sets 30 is provided with the brake block mounting hole 40 for installing a brake block (not shown in the figures), and the treading platform 50 is mounted on one side of the base 100 opposite to the brake block mounting hole 40. In one embodiment, the treading platform 50 is divided into a first section 51 provided on one side of the brake block mounting hole 40, a second section 52 whose area is smaller than that of the first section 51, and a connecting section 53 whose area is smaller than the second section 52 and connecting the first section 51 and the second section 52. The first section 51 corresponds to a user's ball of foot, and the second section 52 corresponds to the user's heel.

Please refer to FIG. 1, FIG. 2, FIG. 3, FIG. 4, FIG. 5, and to FIG. 6 again. In one embodiment, the skeleton 10 comprises two long plates 12 and a plurality of connecting blocks 14. The two long plates 12 are disposed in parallel, and the connecting blocks 14 are disposed between the two long plates 12 to form the two roller frame mounting hole sets 30. The connecting blocks 14 are disposed at intervals, so that the hollow areas 11 are formed between the connecting blocks 14 and the two long plates 12. Further, each of the two long plates 12 includes a body 121 and a skirt 122 connected to one side edge of the body 121. The body 121 comprises a plurality of mountain portions 123 and valley portions 124 on one side opposite to the skirt 122, an extending direction 125 of the skirt 122 is perpendicular to an extending direction 126 of the body 121, and the hollow areas 11 are formed at intervals at a connection between the skirt 122 and the body 121. In one embodiment, the reinforcing shell 20 is formed with a side frame 23 disposed on one side of the body 121 opposite to the skirt 122, and a shape of the side frame 23 is in harmony with the mountain portions 123 and the valley portions 124. In another embodiment, each of the two long plates 12 includes a plurality of notches 127, and the notches 127 are disposed corresponding to the hollow areas 11 and located at the connection between the skirt 122 and the body 121.

In addition, please refer to FIG. 1, FIG. 2, FIG. 3, FIG. 4, FIG. 5, and to FIG. 6 again. One of the connecting blocks 14 at an end is formed with a tube 141 and a boss 142. The tube 141 is used to form one of the holes 31 of one of the two roller frame mounting hole sets 30. The boss 142 extends obliquely from a bottom edge of the tube 141 in an outward direction relative to the skeleton 10, wherein the bottom edge of the tube 141 referred herein is one side of the tube 141 that is not communicated to the outside, that is, a bottom of the tube 141. In one embodiment, at least one hollow area 11 which let the reinforcing shell 20 be able to penetrate through after injection molding is formed between the boss 142 and the tube 141 among the connecting block 14, thereby fixing an assembly position of the reinforcing shell 20 and the connecting block 14. It should be understood that the hollow area 11 is used to provide for injection of the second material, that is, a shape of the hollow area 11 is in a hole type or a groove type.

Further, the boss 142 is formed with two end portions 143 and a connecting recess 144 connecting the two end portions 143 on a side surface opposite to the tube 141. The two end portions 143 are located on two sides of the brake block mounting hole 40 respectively. The two end portions 143 are protruding relative to the two long plates 12, and the two end portions 143 will also be enclosed by the reinforcing shell 20 after the reinforcing shell 20 is injection molded, thereby assisting in reducing relative displacement between the reinforcing shell 20 and the skeleton 10. In one embodiment, in order for the present invention to assist in improving an assembly stability of the reinforcing shell 20 and the connecting block 14, the two end portions 143 are respectively formed with the hollow area 11 for disposing the reinforcing shell 20 thereon and increasing an assembly area between the skeleton 10 and the reinforcing shell 20. Furthermore, each of the two long plates 12 of the invention is provided with a side wing 128 located on one side of the boss 142. The side wing 128 extends from the body 121 in a direction opposite to the connecting block 14, and the side wing 128 assists in stabilizing assembling between the reinforcing shell 20 and the skeleton 10.

Accordingly, through the skeleton 10 and the reinforcing shell 20 of the base 100 for roller skates of the invention being made of different materials, the reinforcing shell 20 is capable of providing cushion and protection for the skeleton 10 after being formed on the skeleton 10 to reduce the problem of brittle fracture easily caused by impact in the conventional base of roller skates. Furthermore, the invention also uses the structures on the skeleton 10 to increase the contact area between the reinforcing shell 20 and the skeleton 10, thereby improving the stability of assembly between the reinforcing shell 20 and the skeleton 10.

What is claimed is:

1. A base for roller skates, comprising:
a skeleton, made of a first material through one-time processing, the skeleton comprising two long plates disposed in parallel, and a plurality of connecting blocks disposed between the two long plates to form two roller frame mounting hole sets, the plurality of connecting blocks disposed at intervals between the two long plates, and the skeleton formed with a plurality of hollow areas located between the plurality of connecting blocks and the two long plates, wherein one of the plurality of connecting blocks at an end of the skeleton is formed with a tube and a boss extending obliquely from a bottom edge of the tube in an outward direction relative to the skeleton, a side surface of the boss opposite to the tube is formed with two end portions and a connecting recess connecting the two end portions, and the two end portions are located on two sides of a brake block mounting hole respectively; and a reinforcing shell, directly disposed on the skeleton by injection molding with a second material, the second material being different from the first material, the reinforcing shell comprising a plurality of inlaid structures respectively embedded in the plurality of hollow areas, and the reinforcing shell is formed with the brake block mounting hole and a treading platform.

2. The base as claimed in claim 1, wherein the first material is metal, and a surface of the skeleton comprises a sandblasting processed layer.

3. The base as claimed in claim 2, wherein the treading platform is divided into a first section provided on one side of the brake block mounting hole, a second section whose area is smaller than that of the first section, and a connecting section whose area is smaller than that of the second section and connecting the first section and the second section.

4. The base as claimed in claim 1, wherein each of the two long plates includes a plurality of notches respectively disposed corresponding to the hollow areas.

5. The base as claimed in claim 4, wherein the treading platform is divided into a first section provided on one side of the brake block mounting hole, a second section whose area being smaller than that of the first section, and a connecting section whose area being smaller than that of the second section connecting the first section and the second section.

6. The base as claimed in claim 5, wherein the first material is metal, and a surface of the skeleton includes a sandblasting processed layer.

7. The base as claimed in claim 1, wherein each of the two long plates includes a body and a skirt connected to one side edge of the body and with an extending direction perpendicular to the body, and a connection between the body and the skirt is formed with the hollow areas at intervals.

8. The base as claimed in claim 7, wherein each of the two long plates includes a plurality of notches respectively disposed corresponding to the hollow areas.

9. The base as claimed in claim 8, wherein the first material is metal, and a surface of the skeleton includes a sandblasting processed layer.

10. The base as claimed in claim 1, wherein one of the connecting blocks formed with the boss is formed with at least one of the plurality of hollow areas between the tube and the boss.

11. The base as claimed in claim 10, wherein each of the two long plates comprises a body and a side wing which is disposed on one side of the boss connected to the body.

12. The base as claimed in claim 11, wherein the first material is metal, and a surface of the skeleton includes a sandblasting processed layer.

* * * * *